May 26, 1953 — H. C. TRYON — 2,639,955
BEARING
Filed Jan. 13, 1949
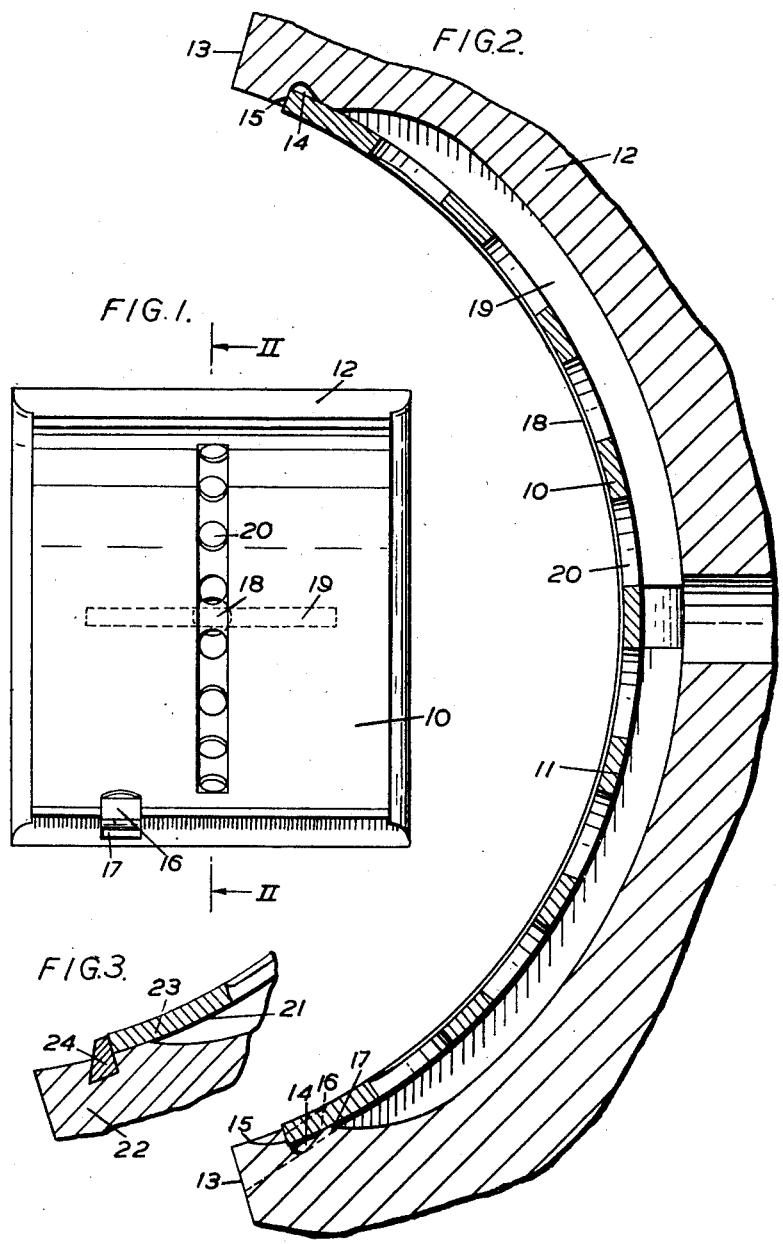
Inventor
Henry C. Tryon
By Emery Holcombe & Blair
Attorneys Patented May 26, 1953

2,639,955

UNITED STATES PATENT OFFICE 2,639,955

BEARING

Henry Christopher Tryon, London, England, assignor to D. Napier & Son Limited, London, England, a company of Great Britain Application January 13, 1949, Serial No. 70,691
In Great Britain January 28, 1948

7 Claims. (Cl. 308—237)

This invention relates to bearings and more particularly but not exclusively, to the bearing between a connecting rod and a crank pin, and has for its object to provide a simple method of arranging and mounting a lining in the member which bears on the rotating part.

According to the present invention a bearing comprises in combination a member which surrounds or partially surrounds a rotating part and which has a concave recess which extends in the axial direction right across it, the recess in the circumferential direction extending over an arc which subtends less than 180°, and a thin walled inherently flexible curved strip of hard metal having a bearing metal face which is a direct force fit in the recess between a pair of abutments which extend in the axial direction at the ends of the recess.

Thus the bearing strip is in circumferential compression and is bedded firmly in the bearing housing over substantially the whole of its length.

The term "direct force fit" is used herein to mean that the bearing strip is a force fit between the abutments with its ends in direct contact with these abutments, no key or wedge being interposed between the bearing strip and either of these abutments.

The invention should therefore not be confused with arrangements in which a substantially semi-cylindrical bearing brass is held in place in a housing by means of a wedge which is driven into a tapered space between one end of the bearing brass and an abutment in the housing.

The bearing strip may be inserted by pressing it into the recess in the axial direction from one side. Alternatively it may be inserted by heating the member which includes the recess so as to expand it, inserting the bearing strip, and allowing the member to cool and so grip the bearing strip between the abutments, or conversely the bearing strip may be cooled before insertion and then allowed to expand when in place.

The surface of the member which includes the recess for the bearing strip may have an integral inwardly projecting and axially extending rib at each end of the recess to constitute the abutments for the ends of the bearing strip and between which the bearing strip is a force fit.

In an alternative arrangement the concave surface of the member which is to form the base of the recess for the bearing strip is machined all over to a uniform radius and includes an axially extending undercut groove adjacent to each end of the bearing strip, while inserted into each groove there is a member shaped to engage the undercut and of which a part stands proud of the concave surface to constitute an abutment for the adjacent end of the bearing strip.

The abutments which define the ends of the recess and between which the bearing strip is pressed may be slightly inclined to each other, converging in the direction of insertion of the bearing strip, so that the bearing strip fits the recess with increasing tightness as its insertion proceeds.

The invention may be carried into practice in various ways, but one particular form of bearing intended more particularly for use in a connecting rod of an opposed piston two-stroke internal combustion engine, and a modification thereof, will be described by way of example with reference to the accompanying drawing, in which Figure 1 is an end elevation of a bearing member with a thin walled bearing strip in place, Figure 2 is a transverse section on the line II—II in Figure 1, and Figure 3 is a fragmentary transverse section of the modified construction.

In the construction of bearing shown in the drawing the bearing surface is provided by a thin-walled bearing strip 10 which extends in a circumferential direction over an arc of between 130° to 140°. The bearing strip is of known construction and consists, for example, of a steel strip plated with a thin layer of a suitable bearing metal.

The bearing strip is carried in a corresponding concave recess 11 in a bearing member 12. The ends 13 of the bearing member 12 are radial and subtend an angle of approximately 150°.

Adjacent to each end 13 of the bearing member 12 there is formed an undercut recess 14 which has a radial end face to provide an abutment 15 for one end of the bearing strip 10. If preferred the surfaces forming the abutments 15 may be slightly undercut.

The bearing strip 10 is a force fit in the recess 11, and may be inserted by pressing it into the recess in the axial direction, that is either from the left or from the right as viewed in Figure 1. Alternatively the bearing strip 10 may be inserted by heating the bearing member 12 before the bearing strip is introduced into the recess and then allowing it to cool and so grip the bearing strip between the abutments, or conversely the bearing strip 10 may be cooled before it is introduced into the recess and then allowed to regain its normal temperature and so expand and firmly engage the abutments. When the bearing is central as shown in Figure 1 a locating tab 16 of the bearing strip 10 is pressed down into a machined recess 17 in the bearing member 12 so as to locate the bearing strip 10 in the axial direction.

The abutments 15 may be slightly inclined to one another so that they converge in the direction of insertion of the bearing strip in order that the latter will fit more tightly as it approaches its central position in the bearing member 12.

The bearing is provided with lubricating grooves and apertures 18, 19 and 20 which may be of any convenient configuration, depending on the lubricating system employed.

In an alternative construction shown in Figure 3, the whole of the concave surface 21 of the bearing member 22 is machined to a uniform radius, and in order to define the recess for receiving the bearing strip 23, axially extending undercut semi-dovetail grooves are formed at each end of the bearing member in each of which is inserted a semi-dovetail member 24 whereof a part stands proud of the surface 21 as shown to act as the abutment for the bearing strip.

The amount by which the tops of the abutments project above the base of the concave recess, and the thickness of the bearing strip, are selected so that the concave bearing surface of the strip will project slightly in the inward radial direction beyond the tops of the abutments.

What I claim as my invention and desire to secure by Letters Patent:

1. A bearing for supporting a rotating part in a member which at least partly surrounds said rotating part, said bearing comprising a concave recess in said member which extends in the axial direction right across said member and in the circumferential direction over an arc which subtends less than 180°, abutments extending in the axial direction at each end of said recess, and a thin walled inherently flexible curved strip of hard metal having a bearing metal face which is a direct force fit in said recess between said abutments, and is rigidly supported by said member.

2. A bearing for supporting a rotating part in a member which at least partly surrounds said rotating part, said bearing comprising a concave recess in said member which extends in the axial direction right across said member and in the circumferential direction over an arc which subtends less than 180°, inwardly projecting abutments integral with said member and extending in the axial direction at each end of said recess, and a thin walled inherently flexible curved strip of hard metal having a bearing metal face which is a direct force fit in said recess between said abutments, and is rigidly supported by said member.

3. A bearing as claimed in claim 2, in which the abutments are slightly inclined to each other, converging in the direction of insertion of the bearing strip, and the cooperating ends of said bearing strip are correspondingly inclined.

4. A bearing for supporting a rotating part in a member which at least partly surrounds said rotating part, said bearing comprising a concave surface in said member which extends in the axial direction right across said member and in the circumferential direction over an arc which subtends less than 180° and which is machined all over to a uniform radius, axially extending undercut grooves adjacent to the ends of said concave surface, elements shaped to engage the undercuts inserted into said grooves, portions of said elements which stand proud of the machined concave surface to constitute abutments, and a thin walled inherently flexible curved strip of hard metal having a bearing metal face which is a direct force fit between said abutments, and is rigidly supported by said member.

5. A bearing as claimed in claim 4, in which the abutments are slightly inclined to each other, converging in the direction of insertion of the bearing strip, and the cooperating ends of said bearing strip are correspondingly inclined.

6. A bearing for supporting a rotating member comprising a supporting member which surrounds a substantial part of the space occupied by said rotating member, said supporting member having a part-cylindrical concave surface of less than 180° in arc extending across it in the axial direction, axially extending abutments at the circumferential ends of said concave surface projecting inwards thereof in a generally radial direction, and a thin walled inherently flexible curved metal strip having a concave face of bearing metal and a convex supporting body of hard metal conforming to said concave surface, said curved metal strip being rigidly supported by said concave surface with its marginal edges frictionally secured between said abutments and with its concave bearing metal face projecting inwardly beyond said abutments.

7. A bearing as set forth in claim 6 wherein the axially extending abutments make a slight angle from the parallel whereby said strip of bearing metal may be forced in the axial direction to a firm engagement there between for securing said strip throughout its bearing area in direct bearing contact with said concave surface.

HENRY CHRISTOPHER TRYON.

References Cited in the file of this patent

UNITED STATES PATENTS

| Number | Name | Date |
| --- | --- | --- |
| 864,663 | Markel | Aug. 27, 1907 |
| 935,022 | Heron | Sept. 28, 1909 |
| 1,121,904 | Doehler | Dec. 22, 1914 |
| 1,746,129 | Robinson | Feb. 4, 1930 |

FOREIGN PATENTS

| Number | Country | Date |
| --- | --- | --- |
| 558,408 | Germany | Sept. 7, 1932 |
| 885,825 | France | June 15, 1943 |